(12) United States Patent
Graf et al.

(10) Patent No.: US 7,726,606 B2
(45) Date of Patent: Jun. 1, 2010

(54) LUGGAGE COMPARTMENT THAT CAN BE LOWERED COMPRISING A HYDRAULIC CYLINDER LOCKING MECHANISM

(75) Inventors: Oleg Graf, Burgrieden (DE); Ralf Poberschnigg, Zirndorf (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/514,357

(22) PCT Filed: May 19, 2003

(86) PCT No.: PCT/EP03/05250

§ 371 (c)(1),
(2), (4) Date: Jun. 16, 2005

(87) PCT Pub. No.: WO03/097456

PCT Pub. Date: Nov. 27, 2003

(65) Prior Publication Data

US 2005/0230541 A1    Oct. 20, 2005

(30) Foreign Application Priority Data

May 17, 2002   (DE)   ................. 102 22 123

(51) Int. Cl.
*B64D 11/00*   (2006.01)
(52) U.S. Cl. ..................... 244/118.5; 312/242
(58) Field of Classification Search .............. 109/73, 109/74; 29/336.3; 224/282, 311, 553, 118.5; 16/412, 429, 66–70; 220/908; 312/242, 312/245, 246, 319.1, 319.2, 247; 49/339; 244/118.1, 118.5, 118.6; 267/64.12, 120
See application file for complete search history.

(56) References Cited

U.S. PATENT DOCUMENTS

| | | | | |
|---|---|---|---|---|
| 3,172,338 | A | * | 3/1965 | Ackerman ................. 92/11 |
| 4,250,415 | A | * | 2/1981 | Lewiner et al. ............ 307/400 |
| 4,456,800 | A | * | 6/1984 | Holland .................. 200/5 A |
| 4,674,230 | A | * | 6/1987 | Takeo et al. ............... 49/32 |

(Continued)

FOREIGN PATENT DOCUMENTS

DE    4209037 C2    9/1993

(Continued)

OTHER PUBLICATIONS

Pneudraulics, http://web.archive.org/web/20010301171755/www.pneudraulics.com/actuators.htm, Mar. 2001.*

(Continued)

*Primary Examiner*—Michael R Mansen
*Assistant Examiner*—Joshua J Michener
(74) *Attorney, Agent, or Firm*—Wood, Herron & Evans, LLP

(57) ABSTRACT

The invention relates to a lowerable luggage compartment (10), in particular for a passenger aircraft, having a pneumatic pressure spring (16) connected to the luggage compartment. In order to be able to latch the luggage compartment (10) in an elegant manner in its closed position, the pneumatic pressure spring (16) is a rigidly blockable pneumatic pressure spring with an externally controllable valve for selectively opening or shutting off the hydraulic system of the pneumatic pressure spring, and the hydraulic system of the pneumatic pressure spring (16) is shut off by means of the valve in the closed position of the luggage compartment (10).

13 Claims, 1 Drawing Sheet

U.S. PATENT DOCUMENTS

Figure 1:
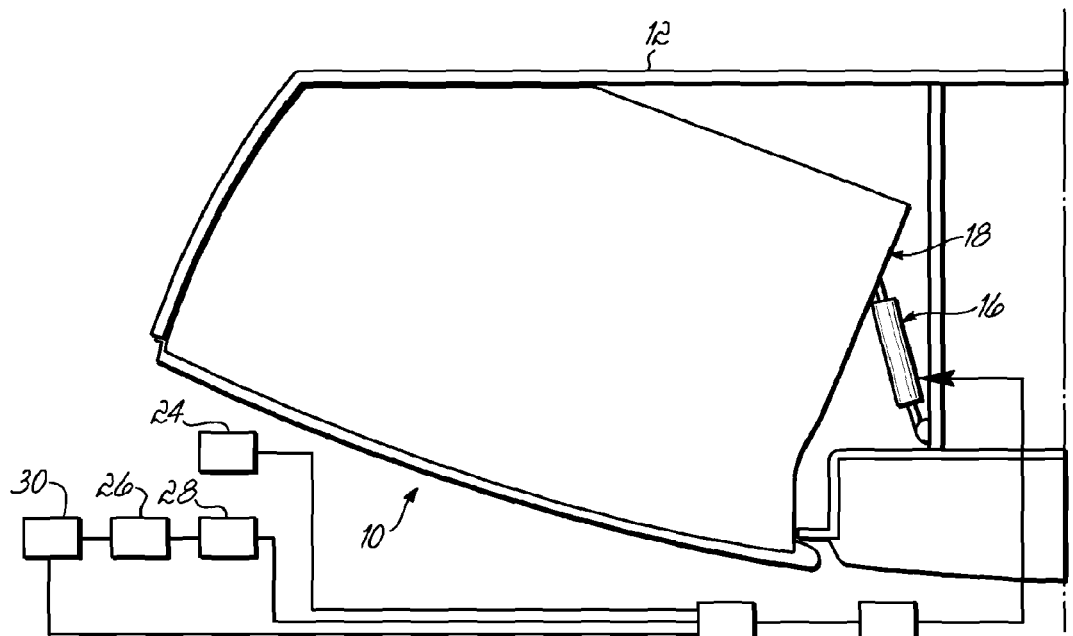

| | | | |
|---|---|---|---|
| 4,682,502 A * | 7/1987 | Miyoshi et al. | 73/723 |
| 4,838,306 A * | 6/1989 | Horn et al. | 137/522 |
| 5,397,111 A * | 3/1995 | Knopp et al. | 267/64.12 |
| 5,441,218 A * | 8/1995 | Mueller et al. | 244/118.1 |
| 5,456,529 A * | 10/1995 | Cheung | 312/245 |
| 5,839,719 A | 11/1998 | Hosan et al. | |
| 5,982,126 A * | 11/1999 | Hellinga et al. | 318/468 |
| 6,193,326 B1 * | 2/2001 | Ybert | 303/15 |
| 6,377,009 B1 * | 4/2002 | Philipp | 318/468 |
| 6,484,969 B2 * | 11/2002 | Sprenger et al. | 244/118.5 |
| 6,557,924 B2 * | 5/2003 | Lauderbach et al. | 296/146.4 |
| 7,118,068 B2 * | 10/2006 | Graf et al. | 244/118.5 |
| 2002/0056360 A1 * | 5/2002 | Shteynberg | 91/4 R |

FOREIGN PATENT DOCUMENTS

| | | |
|---|---|---|
| DE | 4335151 C2 | 4/1995 |
| DE | 4446772 C1 | 5/1996 |
| DE | 19800588 C2 | 7/1999 |
| EP | 0381188 B1 | 1/1995 |
| EP | 1249392 A1 | 10/2002 |
| JP | 11236937 A | 8/1999 |

OTHER PUBLICATIONS

EPO, Translation DE4446772, pp. 1-3.*
EPO, Translation DE4335151, pp. 1-3.*
Machine Translation, DE19800588.*
Forms PCT/ISA/210, 220 International Search Report for PCT/EP03/O5250, Sep. 2003.

* cited by examiner

LUGGAGE COMPARTMENT THAT CAN BE LOWERED COMPRISING A HYDRAULIC CYLINDER LOCKING MECHANISM

The present invention relates to a lowerable luggage compartment, in particular for a passenger aircraft.

Lowerable luggage compartments often have a force assistance device, which reduces the force to be applied by a user when closing a loaded luggage compartment. These force assistance devices are mounted on the sides of the luggage compartment and often comprise a pneumatic pressure spring, which supplies the requisite assistance force. In the closed position, the luggage compartment is secured by means of mechanical locks or similar latching units, which are situated on both sides of the luggage compartment and in the latched position establish a positive connection with the closed luggage compartment. The locks as well as the force assistance devices take up installation space laterally of the luggage compartment, so that between adjacent luggage compartments there has to be a gap, which is not available as useful volume.

The underlying object of the invention is to provide a latchable lowerable luggage compartment, the latching system of which is lighter and takes up less installation space than previous latching systems.

In the case of a lowerable luggage compartment having a pneumatic pressure spring connected to the luggage compartment, this object is achieved according to the invention in that the pneumatic pressure spring is a rigidly blockable pneumatic pressure spring having an externally controllable valve for selectively opening or shutting off the hydraulic system of the pneumatic pressure spring, and in that the hydraulic system of the pneumatic pressure spring is shut off by means of the valve in the closed position of the luggage compartment. According to the invention, there is therefore no longer any need for a separate mechanical latching system that takes up installation space at the sides of the luggage compartment, rather the latching of the lowerable luggage compartment in its closed position is achieved by means of a rigidly blockable pneumatic pressure spring. Here, the term "closed position" is to be taken to mean that the luggage compartment is at least substantially closed. For example, it is immaterial if, owing to extremely asymmetrical loading of the luggage compartment, one luggage compartment side still hangs down slightly because a rigidly blockable pneumatic pressure spring may be latched in any of its stroke positions. In contrast thereto, given conventional mechanical latching by means of locking bolts at both luggage compartment sides, these two luggage compartment sides actually have to reach the closed position completely because, otherwise, no latching by means of the locking bolts may occur.

Such a rigidly blockable pneumatic pressure spring may be used instead of the pneumatic pressure springs that are traditionally used in the described force assistance devices and are neither rigidly nor resiliently blockable. If required, however, such a rigidly blockable pneumatic pressure spring may also be additionally provided, e.g. when the employed force assistance device does not comprise a pneumatic pressure spring. The pneumatic pressure spring latching system according to the invention may be disposed at the sides of the luggage compartment, e.g. as part of a conventional force assistance device, but it is preferably disposed at the back of the luggage compartment, particularly preferably in the middle of the back because then an asymmetrical loading of the luggage compartment has the least effect. Furthermore, the pneumatic pressure spring latching system is far less obtrusive at the back of the luggage compartment than at the sides thereof.

When a pneumatic pressure spring latching system according to the invention is disposed in the middle of the back of the luggage compartment, this is perfectly adequate for secure latching of the luggage compartment in its closed position. Even extremely asymmetrical loading of the luggage compartment or loads arising in the event of crash landing of an aircraft do not lead to unintentional opening of the luggage compartment, because a rigidly latched pneumatic pressure spring is capable of withstanding forces of up to 10,000 N.

According to a preferred embodiment, the valve, which selectively opens or shuts off the hydraulic system of the pneumatic pressure spring, is an electrically actuable valve. This electrically actuable valve is preferably actuated by an electric motor, alternatively activation by means of an electromagnet is possible.

In preferred embodiments of the luggage compartment according to the invention, a signal of a sensor, which detects the closed position of the luggage compartment, controls the electrically actuable valve into its shut-off position. The pneumatic pressure spring is then rigidly blocked, thereby latching the luggage compartment in its closed position.

In all embodiments of the lowerable luggage compartment according to the invention there is preferably a device, which detects actuation of a handle of the luggage compartment and then controls the electrically actuable valve into its open position. This device may be a sensor provided in the handle region of the luggage compartment. The sensor may take the form of a contact surface. According to an embodiment, the contact surface is a touch-sensitive foil. Alternatively, the device may be a switch, preferably a microswitch, which interacts with the handle of the luggage compartment.

Figure 2:
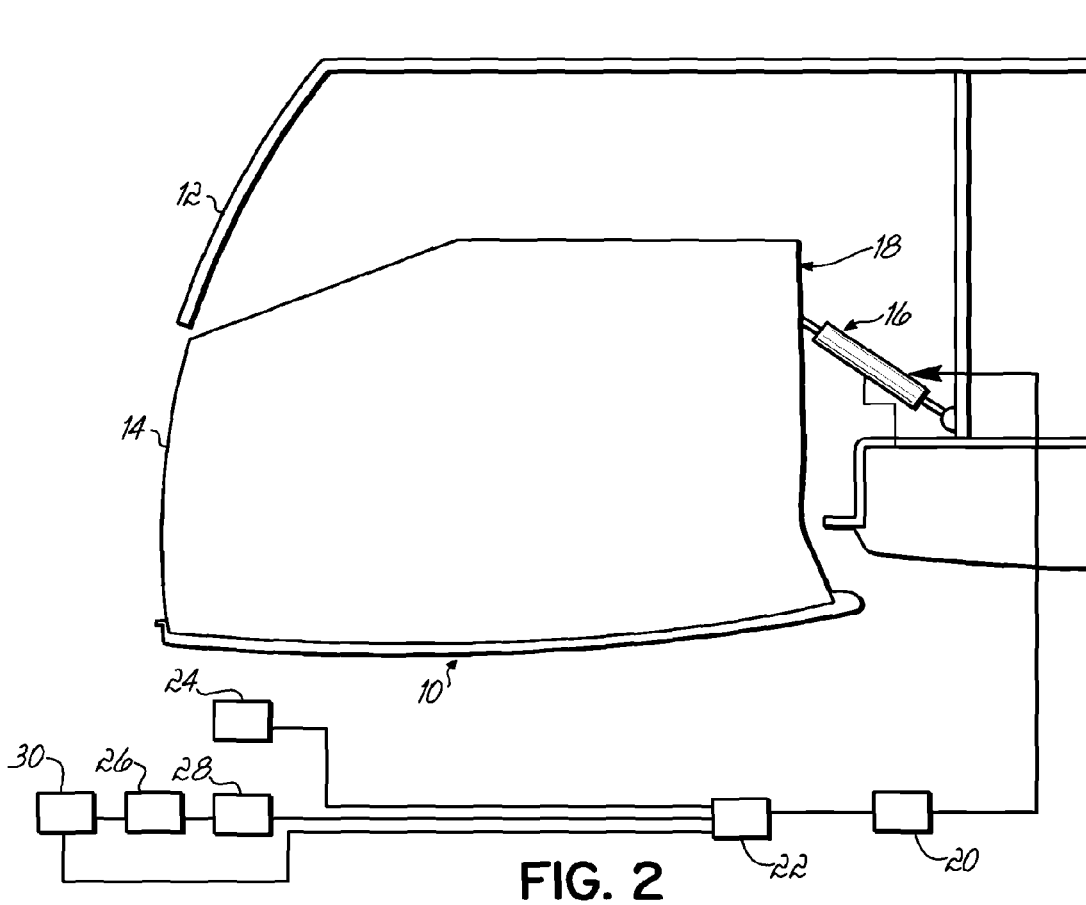

An embodiment of a lowerable luggage compartment according to the invention with pneumatic pressure spring latching is described in detail below with reference to the accompanying diagrammatic drawings. The drawings show:

FIG. 1 a side view of a lowerable luggage compartment according to the invention with pneumatic pressure spring latching in closed position, and FIG. 2 the luggage compartment of FIG. 1 in its open position.

FIG. 1 shows a lowerable luggage compartment, which is generally denoted by 10 and in the illustrated form is an overhead luggage compartment in a passenger aircraft. The luggage compartment 10 is accommodated in a housing 12, which in a generally known and therefore not further illustrated manner is connected to the supporting structure of the aircraft.

The connecting of the luggage compartment 10 to the housing 12 is effected by means of known and therefore likewise not further illustrated devices, which enable the opening and closing of the luggage compartment 10 and ensure that the luggage compartment 10, when it is opened from the closed position shown in FIG. 1, is lowered into the open position shown in FIG. 2. In the lowered position, the open front 14 of the luggage compartment 10 is accessible to allow loading of the luggage compartment 10.

Situated at the back of the luggage compartment 10 is a pneumatic pressure spring 16, of which one end is attached pivotally to the back wall 18 of the luggage compartment 10 and the other end is attached pivotally to the housing 12 and/or to the supporting structure of the aircraft. The pneumatic pressure spring 16 is a rigidly blockable pneumatic pressure spring with an externally controllable valve 20 by virtue of the opening and/or closing of which the hydraulic system of the pneumatic pressure spring may be shut off. The valve 20 is electrically actuable by means of an electric motor 22. The electric motor 20 is controlled by a sensor 24 which detects the closed position of the luggage compartment 10, in such a way that the valve 20 is brought into its shut-off position as soon as the sensor 24 signals the closed position. Because of the hydraulic system of the pneumatic pressure spring 16 being shut-off in said manner, the pneumatic pressure spring 16 is then rigidly blocked, so that it is no longer possible to open the luggage compartment 10. A rigidly blocked pneumatic pressure spring is capable of withstanding forces of up to 10,000 N, thereby ensuring that the luggage compartment 10 will not open unintentionally, even under extreme loads.

To open the luggage compartment 10, a user has to grasp a handle 26. According to an embodiment, touching of the handle 26 is detected by a sensor 28 which supplies a signal that causes the electric motor 22 which actuates the valve 20 to bring the valve 20 of the hydraulic system of the pneumatic pressure spring 16 into its open position. It is then possible for the luggage compartment 10 to be lowered once more.

According to another embodiment, a user has to execute an opening movement at the handle 26, e.g. pull on a handle plate, and a switch 30 interacting with the handle 26, preferably a microswitch, registers this movement and by means of a corresponding signal causes the valve 20 of the pneumatic pressure spring 16 to be moved into its open position.

The invention claimed is:

1. An overhead luggage compartment for aircraft, comprising:
    an enclosure movable to an open position and a closed position;
    a rigidly blockable pneumatic pressure spring coupled to said enclosure and operable to facilitate movement of said enclosure, said pneumatic pressure spring having a first condition wherein said enclosure is movable by a user-applied force on said enclosure between said open position and said closed position, and a second condition wherein said enclosure is locked by said pneumatic pressure spring against movement from said open position, said closed position, and any position between said open position and said closed position;
    a handle that facilitates moving said enclosure between said closed position, said open position, and said intermediate position; and
    a sensor associated with said handle and operable to place said pneumatic pressure spring in said first condition.

2. The luggage compartment of claim 1, wherein said pneumatic pressure spring is placed in said second condition when said enclosure is moved to said closed position.

3. Luggage compartment according to claim 1, characterized in that the pneumatic pressure spring (16) is disposed at the back of the luggage compartment (10).

4. Luggage compartment according to claim 3, characterized in that the pneumatic pressure spring (16) is disposed at least approximately in the middle of the back of the luggage compartment (10).

5. Luggage compartment according to claim 1, further comprising an electrically actuable valve associated with said pneumatic pressure spring and operable to switch said pneumatic pressure spring to and from said first and second conditions.

6. Luggage compartment according to claim 5, characterized in that the electrically actuable valve is actuated by an electric motor.

7. Luggage compartment according to claim 5, characterized in that a signal of a sensor, which detects the closed position of the luggage compartment (10), controls the electrically actuable valve into its shut-off position.

8. Luggage compartment according to claim 5, characterized in that the sensor detects actuation of the handle of the luggage compartment (10) and controls the electrically actuable valve into its open position.

9. Luggage compartment according to claim 8, characterized in that the sensor is provided in the handle region of the luggage compartment (10).

10. Luggage compartment according to claim 9, characterized in that the sensor is a contact surface.

11. Luggage compartment according to claim 10, characterized in that the contact surface is a touch-sensitive foil.

12. An overhead luggage compartment for aircraft, comprising:
    an enclosure movable to an open position and a closed position;
    a rigidly blockable pneumatic pressure spring coupled to said enclosure and operable to facilitate movement of said enclosure, said pneumatic pressure spring having a first condition wherein said enclosure is movable by a user-applied force on said enclosure between said open position and said closed position, and a second condition wherein said enclosure is locked by said pneumatic pressure spring against movement from said open position, said closed position, and any position between said open position and said closed position;
    an electrically actuable valve associated with said pneumatic pressure spring and operable to switch said pneumatic pressure spring to and from said first and second conditions; and
    a sensor provided in a handle region of the luggage compartment adapted to detect actuation of a handle of the luggage compartment to thereby control the electrically actuable valve to said first condition.

13. An overhead luggage compartment for aircraft, comprising:
    an enclosure movable to an open position and a closed position;
    a rigidly blockable pneumatic pressure spring coupled to said enclosure and operable to facilitate movement of said enclosure, said pneumatic pressure spring having a first condition wherein said enclosure is movable by a user-applied force on said enclosure between said open position and said closed position, and a second condition wherein said enclosure is locked by said pneumatic pressure spring against movement from said open position, said closed position, and any position between said open position and said closed position;
    an electrically actuable valve associated with said pneumatic pressure spring and operable to switch said pneumatic pressure spring to and from said first and second conditions; and
    a switch which interacts with a handle of the luggage compartment, the switch adapted to detect actuation of the handle of the luggage compartment to thereby control the electrically actuable valve to said first condition.

* * * * *